United States Patent
Wang et al.

(10) Patent No.: US 7,300,475 B2
(45) Date of Patent: Nov. 27, 2007

(54) MANUFACTURING METHOD FOR ELECTRODE APPARATUS OF BATTERY

(75) Inventors: David Shau-Chew Wang, Taipei (TW); Chih-Ming Yu, Kaohsiung (TW); Yi-Nuo Chen, Taipei (TW)

(73) Assignee: Polytronics Technology Corporation, Hsinchu (TW)

( * ) Notice: Subject to any disclaimer, the term of this patent is extended or adjusted under 35 U.S.C. 154(b) by 485 days.

(21) Appl. No.: 10/938,320

(22) Filed: Sep. 10, 2004

(65) Prior Publication Data
US 2005/0103405 A1    May 19, 2005

(30) Foreign Application Priority Data
Sep. 17, 2003   (TW) ............... 92125549 A

(51) Int. Cl.
*H01M 2/34*  (2006.01)
*H01M 10/04* (2006.01)
*H01C 7/02*  (2006.01)

(52) U.S. Cl. ............ 29/623.1; 429/62; 338/22 R

(58) Field of Classification Search ............ None
See application file for complete search history.

(56) References Cited

U.S. PATENT DOCUMENTS 5,046,971 A * 9/1991 Ruggiero et al. ........... 439/741

* cited by examiner

*Primary Examiner*—Jonathan Crepeau
(74) *Attorney, Agent, or Firm*—Seyfarth Shaw LLP

(57) ABSTRACT

A method for manufacturing a circular electrode apparatus of a battery for resistance stability improvement comprises the following procedures. First, an electrode structure of a battery including an upper electrode plate, an over-current protection device and lower electrode plate is provided, wherein the over-current protection device is a lamination constituted of an upper metal foil, a current-sensitive layer and a lower metal foil. Secondly, the electrode structure is treated by high-speed impact, vibration, hot-cold impact, acid pickling, water pickling or sand blasting to become the electrode apparatus of the present invention whereby the mean value of the resistance of the electrode apparatuses is below 0.05 ohm, and the deviation of the resistances of the electrode apparatuses is below 0.005 ohm at 25° C.

5 Claims, 5 Drawing Sheets

MANUFACTURING METHOD FOR ELECTRODE APPARATUS OF BATTERY

BACKGROUND OF THE INVENTION (A) Field of the Invention

The present invention is related to a manufacturing method for an electrode apparatus of a battery, more specifically, to a manufacturing method for an electrode apparatus of a battery capable of over-current protection, with a view to increasing resistance stability thereof.

(B) Description of Related Art

For the present broad application of portable electronic products, such as mobile phone, notebook computer, digital camera, personal digital assistant (PDA), etc., the use of over-current protection devices to prevent short circuit caused by an over-current or over-heating effect in a secondary battery or circuit device is becoming more and more important.

Conventionally, a positive electrode is essentially constituted of an upper electrode plate, an over-current protection device and a lower electrode plate, where the over-current protection device is sandwiched between the upper and lower electrode plates. The over-current protection device is a lamination constituted of an upper metal foil, a current-sensitive layer and a lower metal foil, where the upper and lower metal foils may be formed by electroplating copper onto nickel alloy.

The current sensitive layer may be composed of positive temperature coefficient (PTC) conductive material including polymer and a conductive fillers. Because PTC conductive material is sensitive to temperature variation, it can be kept extremely low resistance at normal operation because of its low sensitivity to temperature variation so that the circuit can operate normally. However, if an over-current or an over-temperature event occurs, the resistance will immediately increase to a high resistance state (e.g., above $10^4$ ohm.) Therefore, the over-current will be reversely eliminated and the objective to protect the circuit device can be achieved.

In the air, the upper and lower metal foils made of pure nickel or of nickel alloy electroplated with copper most likely form films of oxidized copper or oxidized nickel on the surfaces. The oxidation films, normally very thin, are formed unexpectedly in accordance with the manufacturing process, inducing the thicknesses of the oxidation films to be non-uniform so that the resistance of the positive electrode is affected. Accordingly, various resistances of electrode apparatuses may be found in mass production, which would negatively affect quality control.

SUMMARY OF THE INVENTION

The objective of the present invention is to increase the resistance stability of an electrode apparatus of a battery and to lower the resistance.

The electrode apparatus of the present invention is a sandwich-like structure including an upper electrode plate, an over-current protection device and a lower electrode plate. The over-current protection device is a lamination constituted of an upper metal foil, a current-sensitive layer and a lower metal foil. Unexpectedly, a metal oxide layer may be formed on the surface of the upper electrode plate, the over-current protection device, and the lower electrode plate. Without proper treatment of the apparatus, the metal oxide layer could result in the resistance variation to the level as high as 0.03 ohm at 25° C. The electrode apparatus of the present invention could minimize the effect of the metal oxide layer and control the resistance variation to the level below 0.005 ohm at 25° C.

The electrode apparatus is treated by at least one of the high-speed impact, vibration, and hot-cold thermal impact to break the metal oxide layer so that the $R_f/R_i$ could drop below 0.8, more preferably below 0.7, and most preferably below 0.6, where $R_f$ is the resistance after treatment and $R_i$ is the initial resistance before treatment.

The treatment could also reduce the standard deviation ratio. The $\sigma_f/\sigma_i$ value could drop to below 0.8, more preferably below 0.6, and most preferably below 0.4, where $\sigma_f$ is the standard deviation after treatment and $\sigma_i$ is the standard deviation before treatment.

The current-sensitive layer may include PTC material, and the upper metal foil and lower metal foil may be made of pure nickel or of nickel alloy electroplated with copper.

The method for manufacturing the circular electrode apparatus, with a view to the resistance stability, includes the following steps. First, an electrode structure of a battery including an upper electrode plate, an over-current protection device and lower electrode plate is provided, where the over-current protection device is a lamination of an upper metal foil, a current-sensitive layer and a lower metal foil. Secondly, the electrode structure is treated by high-speed impact, vibration, hot-cold thermal impact, acid pickling, water pickling and sand blasting to become the electrode apparatus of the present invention whereby the resistance variation of the apparatus can be controlled to the level below 0.005 ohm at 25° C.

The hot-cold thermal impact treatment is to put the electrode structure in an environment of temperature ramping up and down within −40° C. to 85° C. The high-speed impact is to hit the electrode structure against a stationary object at a speed greater than 2 meters per second. The vibration is to put the electrode structure in a container and to shake the container back and forth with a displacement of at least 20 centimeters in a vibrator.

BRIEF DESCRIPTION OF THE DRAWINGS

The present invention will be described according to the appended drawings in which.

DESCRIPTION OF PREFERRED EMBODIMENTS

Figure 1A:
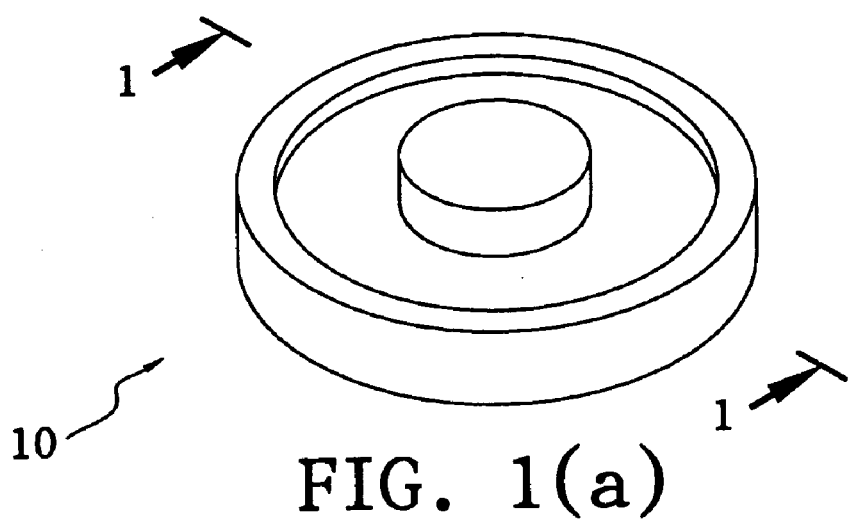
FIG. 1(a) illustrates an electrode apparatus of a battery in accordance with the present invention.
Figure 1B:
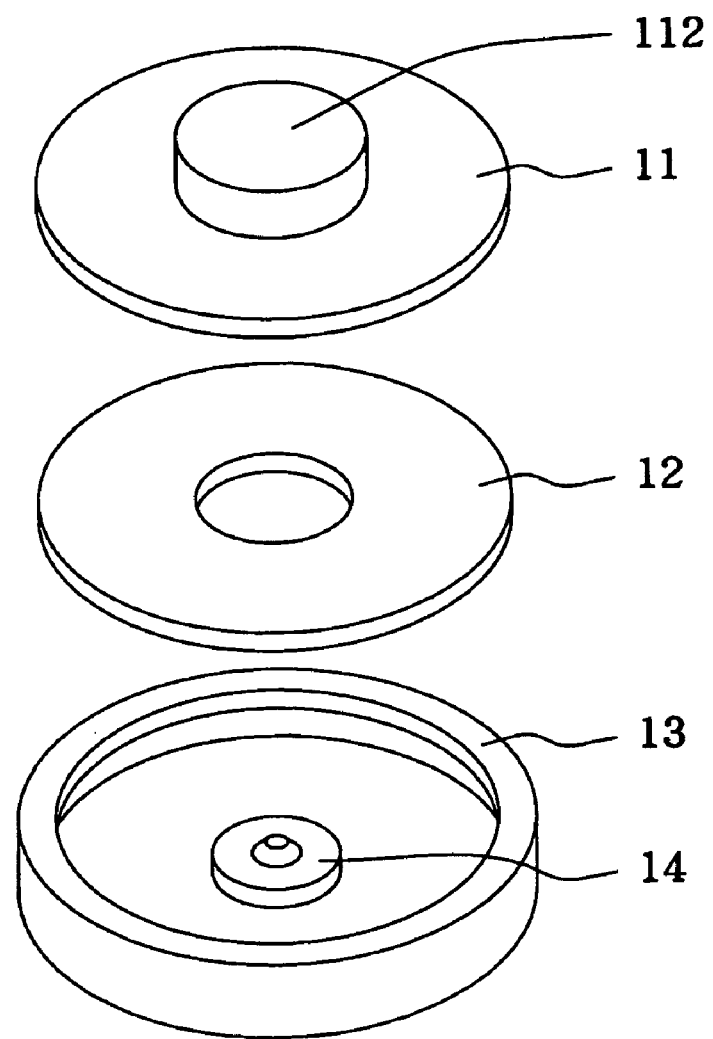
FIG. 1(b) illustrates an explosive diagram of the electrode apparatus of FIG. 1(a)
Figure 1C:
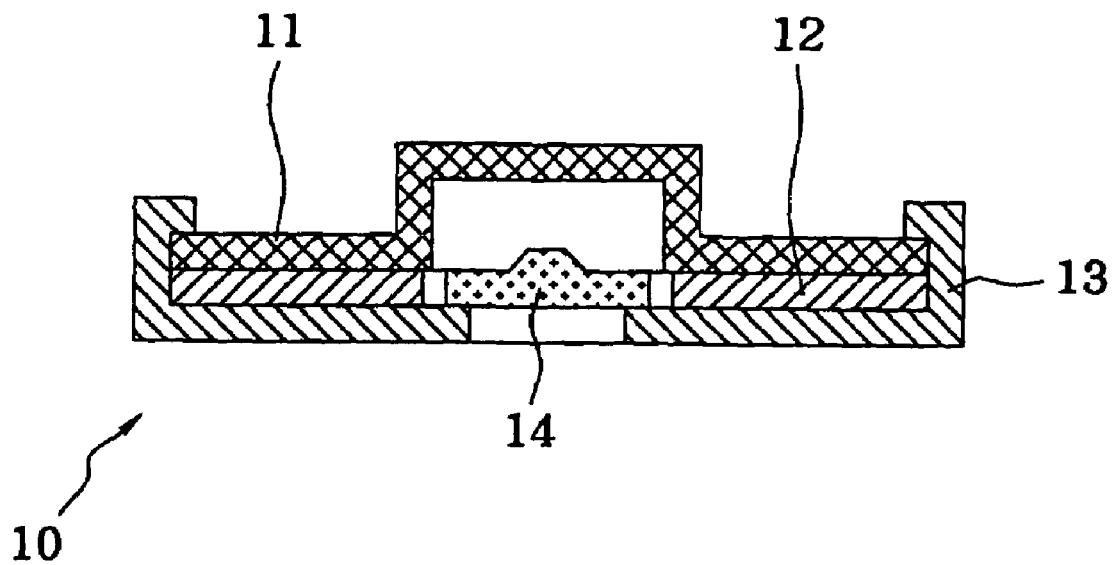
FIG. 1(c) is the cross-sectional view along line 1-1 of FIG. 1(a)
Figure 1D:
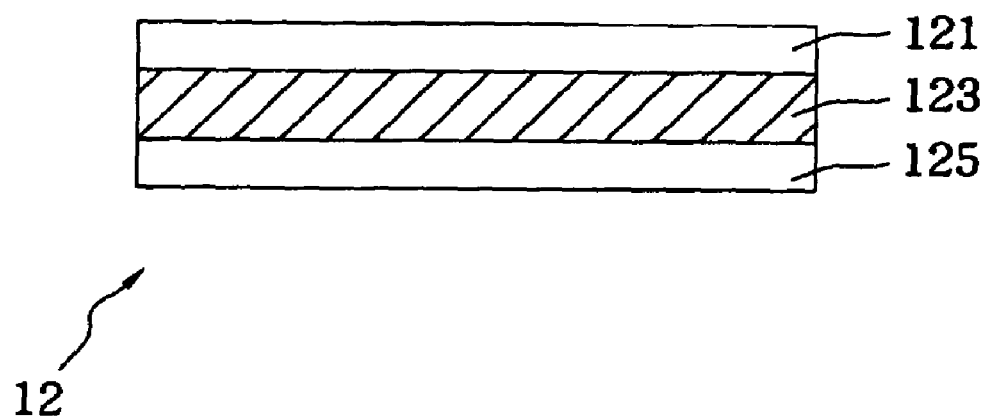
FIG. 1(d) illustrates an over-current protection device of the electrode apparatus in accordance with the present invention.

FIG. 1(a) illustrates an electrode apparatus 10 of a battery in accordance with the present invention, which can be applied to a positive electrode of a battery. FIG. 1(b) illustrates the detailed components of the electrode apparatus 10 including an upper electrode plate 11, an over-current protection device 12 and a lower electrode plate 13. The upper electrode plate 11 is pressed to form a protrusion 112 intended to be connected to a wire of an appliance to be used for power supply to the appliance. The center of the lower electrode plate 13 is provided with a safety gas valve 14 that will be open to release the interior pressure of the battery when the interior pressure is too high, so as to avoid explosion of the battery. One thing here to be aware of is that, in addition to the structure, an adequate process is further performed on the electrode apparatus 10 whereby the resistance variation of a plurality of electrode apparatuses is below 0.005 ohm. The relevant detailed process is described later.

FIG. 1(*c*) is the cross-sectional view along line 1-1 in FIG. 1(*a*), in which the relations between the upper electrode plate 11, the over-current protection device 12, the lower electrode plate 13 and the gas valve 14 are clearly illustrated.

Referring to FIG. 1(*d*), the over-current protection device 12 is composed of an upper metal foil 121, a current-sensitive layer 123 and a lower metal foil 125 laminated in order, where the upper metal foil 121 may be a multilayer structure formed by electroplating, and the lower foil 125 may be a multilayer structure formed by electroplating also.

Figure 2:
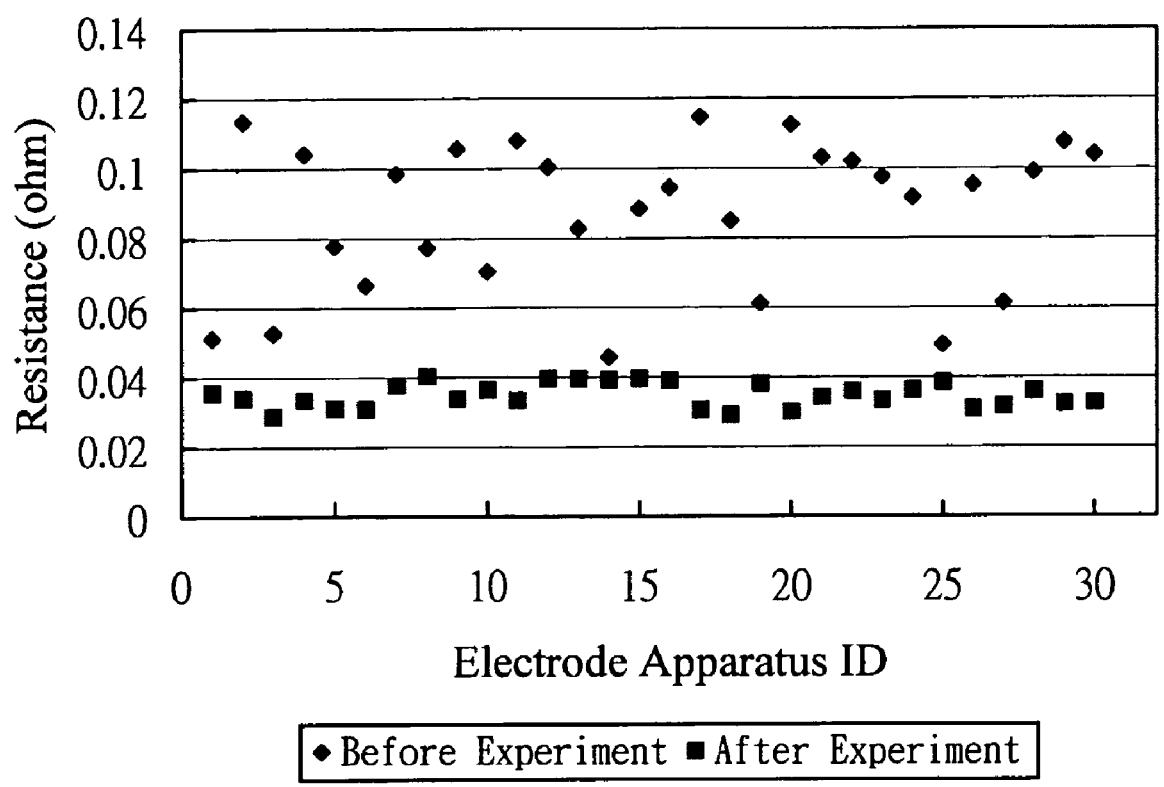
FIG. 2 illustrates the resistances of the electrode apparatuses put forth in the present invention before and after high-speed impact experiment.

FIG. 2 illustrates the resistance variances of thirty electrode apparatuses 10 before and after performing high-speed impact experiment, e.g., drop experiment, in that the electrode apparatuses 10 are dropped from two meters high by gravity. The mean of the resistance values at 25° C. before and after experiment is changed from 0.0874 ohm to 0.0348 ohm, and all the resistances after experiment are below 0.05 ohm. In addition, the resistance variation is from 0.017 ohm down to 0.003 ohm. After the electrode apparatuses 10 are dropped, the oxidation layers on the upper and lower metal foils 121 and 125 may be crashed or shifted so that the resistance of the electrode apparatus 10 can be decreased. Further, the standard deviation of the resistances of the thirty electrode apparatuses 10 can be effectively decreased; thereby the problem of unstable resistances of the electrode apparatuses can be resolved.

Figure 3:
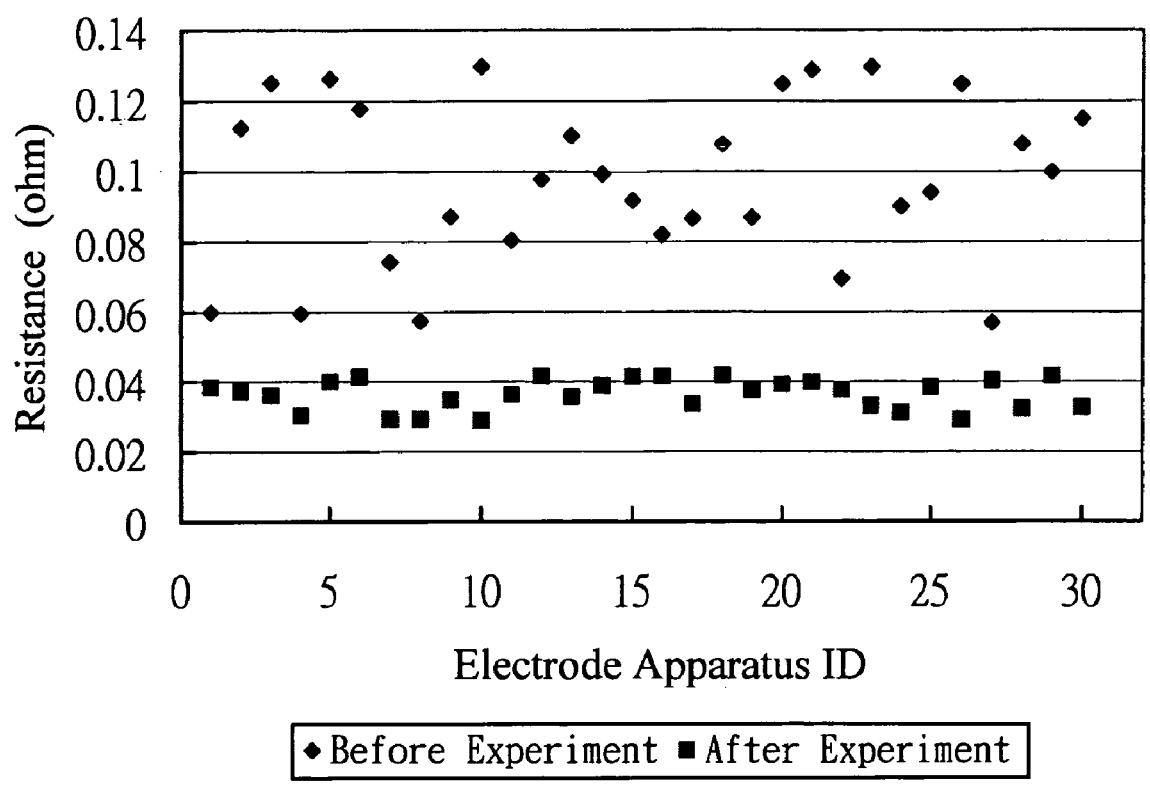
FIG. 3 illustrates the resistances of the electrode apparatuses put forth in the present invention before and after vibration experiment.

FIG. 3 illustrates the resistance variances of thirty electrode apparatuses 10 before and after vibration experiment in that thirty electrode apparatuses 10 are put into a circular container whose diameter is 100 mm and length is 147 mm, and the container is shook back and forth ten times with a displacement of 30 cm (at least 20 cm), and the frequency is between 1 to 2 times per second. As shown in FIG. 3, the mean of the resistance values at 25° C. before and after experiment is changed from 0.0978 ohm to 0.0363 ohm, and all the resistances after experiment are below 0.05 ohm. In addition, the resistance variation is changed from 0.023 ohm to 0.002 ohm. The circular container may be substituted by a container of another shape only if the capacity is sufficient to accommodate numerous electrode apparatuses.

Figure 4:
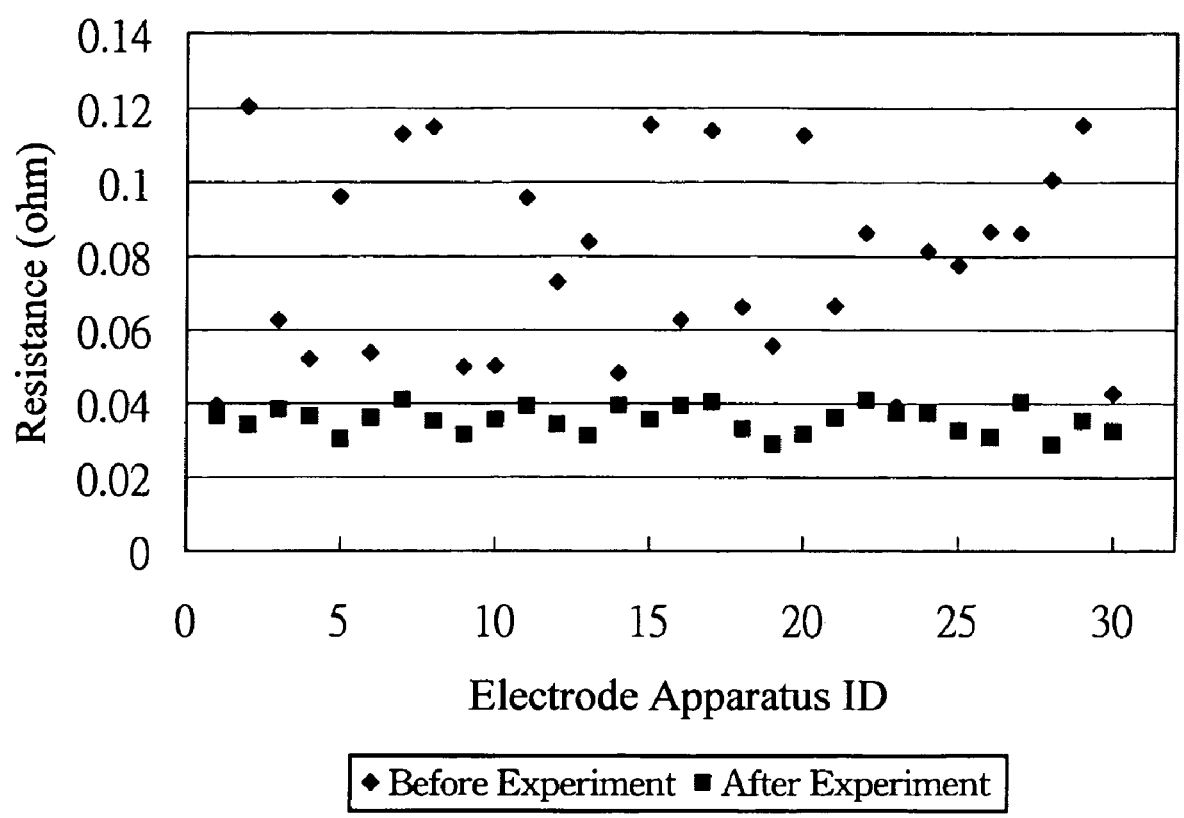
FIG. 4 illustrates the resistances of the electrode apparatuses put forth in the present invention before and after hot-cold thermal impact experiment.

FIG. 4 illustrates the resistance variances of thirty electrode apparatuses 10 before and after hot-cold thermal impact experiment in that thirty electrode apparatuses 10 are put into a box controlled within −40° C. to 85° C., and the temperature of the box continuously ramps up and down three times. As shown in FIG. 4, the mean of the resistance values at 25° C. before and after experiment is changed from 0.0788 ohm to 0.0355 ohm, and all the resistances after experiment are below 0.05 ohm. In addition, the resistance variation is changed from 0.021 ohm to 0.02 ohm.

Moreover, the resistance change ratios $R_f/R_i$ of the above tests are below 0.8, and most preferably below 0.6, where $R_f$ is the resistance after treatment and $R_i$ is the initial resistance before treatment. The standard deviation ratios ($\sigma_f/\sigma_i$) of the above tests are below 0.8, and most preferably below 0.4, where $\sigma_f$ is the standard deviation after treatment and $\sigma_i$ is the standard deviation before treatment.

The sample sizes of the above experiments all meet the minimum valid sample size criteria in statistics, e.g., 25 or 30, and the deviations of resistances are below 0.003 ohm. Therefore, even if the electrode apparatus is formed by mass production and the experiment errors are taken into consideration, the deviation of resistances should be below 0.005 ohm as expected, thereby the resistance stability of the electrode apparatuses can be improved effectively. A positive electrode application is exemplified above; nevertheless, the electrode apparatus of the present invention can also be applied to a negative electrode including an over-current protection device.

In addition to the above treatments, acid pickling, water pickling or sand blasting can also employed to decrease the resistance and the resistance standard deviation of the electrode apparatuses, so as to improve the resistance stability of the electrode apparatuses 10.

The above-described embodiments of the present invention are intended to be illustrative only. Numerous alternative embodiments may be devised by those skilled in the art without departing from the scope of the following claims.

What is claimed is:

1. A method for manufacturing an electrode apparatus, comprising the steps of:
   providing an electrode structure including an upper electrode plate; an over-current protection device and a lower electrode plate, wherein the over-current protection device is ring-shaped and in the form of a lamination constituted of an upper metal foil, a current-sensitive layer and a lower metal foil; and
   treating the electrode structure by in which the electrode structure is hit against a stationary object at a speed above 2 meters per second, so as to form an electrode apparatus, wherein the electrode apparatus has the following characteristics:
   (a) a resistance is below 0.05 ohm at 25° C.;
   (b) a deviation of resistances of a plurality of electrode apparatuses is below 0.005 ohm at 25° C.;
   (c) the $R_f/R_i$ value is less than 0.8, where $R_f$ is the resistance after treatment and $R_i$ is the initial resistance before treatment; and
   (d) the $\sigma_f/\sigma_i$ value is less than 0.8, where $\sigma_f$ is the standard deviation after treatment and $\sigma_i$ is the standard deviation before treatment.

2. The method for manufacturing electrode apparatus in accordance with claim 1, wherein the current sensitive layer comprises a positive temperature coefficient material.

3. The method for manufacturing electrode apparatus in accordance with claim 1, wherein the upper and lower metal foils are made of pure nickel or made of nickel alloy electroplated with copper.

4. The method for manufacturing electrode apparatus in accordance with claim 1, wherein the electrode apparatus is applied to a positive electrode of a battery.

5. The method for manufacturing electrode apparatus in accordance with claim 4, wherein the electrode apparatus further comprises a gas valve for releasing the interior pressure of the battery so as to prevent an explosion of the battery.

* * * * *